(12) United States Patent  
Smith et al.

(10) Patent No.: US 6,308,734 B1
(45) Date of Patent: Oct. 30, 2001

(54) DRY RUNNING COOLANT UNION

(75) Inventors: Brian E. Smith, Andover; Ross A. Wenk, St. Paul, both of MN (US)

(73) Assignee: Talco, Inc., Fridley, MN (US)

( * ) Notice: Subject to any disclaimer, the term of this patent is extended or adjusted under 35 U.S.C. 154(b) by 0 days.

(21) Appl. No.: 09/658,803

(22) Filed: Sep. 11, 2000

Related U.S. Application Data

(63) Continuation-in-part of application No. 09/298,030, filed on Apr. 22, 1999, now abandoned.

(51) Int. Cl.[7] .................................................... F16L 27/08
(52) U.S. Cl. .......................... 137/580; 285/4; 285/281; 277/412; 277/422
(58) Field of Search ................. 137/580; 285/14, 285/278, 281; 277/404, 412, 422

(56) References Cited

U.S. PATENT DOCUMENTS

| | | |
|---|---|---|
| 2,797,108 | 6/1957 | Royer . |
| 3,129,960 * | 4/1964 | Schrodt ........................ 277/412 X |
| 3,770,305 * | 11/1973 | Camosso ..................... 277/412 X |
| 3,877,732 | 4/1975 | Mohaupt . |
| 3,957,294 | 5/1976 | Hoban et al. . |
| 4,368,895 * | 1/1983 | Okamoto et al. ............... 277/412 X |
| 4,449,739 | 5/1984 | Raether . |
| 4,462,617 | 7/1984 | Green . |
| 4,561,681 | 12/1985 | Lebsock . |
| 4,693,481 | 9/1987 | Quinn . |
| 4,790,699 * | 12/1988 | Ringel ............................ 137/580 X |
| 4,848,400 | 7/1989 | Grant et al. . |
| 4,976,282 | 12/1990 | Kubala . |
| 5,058,927 | 10/1991 | Miwa . |
| 5,203,592 | 4/1993 | Takada . |
| 5,240,039 * | 8/1993 | Colussi et al. ..................... 137/580 |
| 5,441,799 * | 8/1995 | Owens et al. ................... 277/404 X |
| 5,445,394 * | 8/1995 | Dusserre-Telmon et al. ....... 277/422 |
| 5,570,908 | 11/1996 | Merritt . |
| 6,029,695 * | 2/2000 | Logan ................................ 137/580 |

* cited by examiner

Primary Examiner—John Rivell
(74) Attorney, Agent, or Firm—Nikolai & Mersereau, P.A.

(57) ABSTRACT

A rotary union for delivery of a coolant fluid to a spindle of a metal working machine comprises a housing having a cylindrical bore containing bearings for journaling a tubular shaft therein wherein the improvement resides in the provision of a floating bushing seal as the high-pressure seal. The floating bushing seal assembly includes a seal housing containing a plurality of longitudinally disposed bushing rings that have a low clearance fit with respect to the tubular shaft of the rotary union.

10 Claims, 2 Drawing Sheets

DRY RUNNING COOLANT UNION

CROSS-REFERENCE TO RELATED APPLICATION

This application is a continuation-in-part of application Ser. No. 09/298,030 Apr. 22, 1999 now abandoned.

BACKGROUND OF THE INVENTION

1. Field of the Invention

This invention relates generally to high speed machining equipment, and more particularly to an improved rotary union for delivering a lubricant/coolant to a tool bit to thereby increase the production rate of metal parts being produced.

2. Discussion of the Prior Art

Rotary unions are commonly used on machine shop tools, such as milling machines, jig bores, engine lathes, drill presses, shapers, planers, etc., to deliver a cooling liquid directly to the location where the cutting tool or bit contacts the workpiece. Typically, a rotary spindle supports a cutting tool or bit in a chuck. Both the rotary spindle and the cutting tool or bit are tubular such that a cooling/lubricating liquid can be made to flow through the lumens thereof and exit the tool bit at its cutting surface. The rotary union is the mechanism that allows introduction of the cooling/lubricating liquid or compressed air into the lumen of the machine tool's spindle from a stationary source, such as a high-pressure pump.

When performing deep boring or drilling operations, it is advantageous to deliver the coolant liquid under high-pressure at the cutting surface of the bit to effectively blast away metal chips from the bore as it is being formed. By removing the metal chips while effectively cooling the bit, boring, milling, drilling other metal working operations can be completed in a considerably shorter time than when the coolant/lubricant is merely flooded on the surface of the workpiece. The rotary union, thus, provides a way to deliver the liquid coolant to a rotating tool in a machining operation.

A popular prior art rotary union for use with metal working machines is that sold by the Deublin Company of North Brook, Ill. The Deublin product is described in the Kubala Patent 4,976,282. A shortcoming in the design of the rotary union of the type described in the Kubala patent centers on the type of high-pressure seal utilized therein. It incorporates a rotating seal member carried by the rotor of the coolant union and a rotating, floating seal member carried by a fluid pressure actuated device that urges the two seal members together when the liquid coolant, under pressure, is applied to the inlet port of the union. This type of seal has proven to be short lived, requiring frequent repair and replacement. Failure of the high-pressure seal allows the liquid coolant to reach the bearings, journaling the rotating shaft, washing away the bearing lubricant, ultimately leading to bearing failure. Also, the Deublin device cannot be used with compressed air when the spindle of the machine tool is running.

U.S. Pat. No. 4,449,739 to Raether discloses a rotary coupling for conducting a high-pressure liquid to a rotatable utilization device. The device disclosed in this patent is primarily intended for use in high-pressure, but low-speed applications, such as in rock drilling. The sealing rings described in this patent utilize alternating plastic and carbon sealing rings. In essence, the sealing rings function in the same manner as common chevron seals where the fluid pressure forces the plastic seals against the rotating shaft. The carbon rings are essentially just spacers, aiding in support of the plastic seal rings to inhibit extrusion of the plastic sealing rings. While such an arrangement may be workable at low rotational speeds, for machine tool applications where shaft speeds may approach 20,000 rpm, the arrangement shown in the Raether et al. patent would not be suitable. The friction between the rotating shaft and the plastic seal rings would rapidly destroy the seal.

It is accordingly a principal object of the present invention to provide an improved rotary union for use with high rpm metal working machines of the type described having an improved bearing seal arrangement that significantly increases the mean time to repair such rotary coolant unions.

Another object of the invention is to provide a non-contact bearing seal arrangement for a rotary union of the type described that can operate at fluid inlet pressures of 2000 psi or more and whose shaft can be rotated in excess of 2500 rpm, e.g., up to 20,000 rpm, for prolonged periods of three years or more.

SUMMARY OF THE INVENTION

The foregoing objects and advantages are achieved in accordance with a first embodiment by providing a rotary fluid coupling that includes a housing with a wall defining a cylindrical bore therein for containing a tubular shaft having a fluid inlet port and a fluid outlet port, the shaft being journaled in a set of bearings also contained within the cylindrical bore of the housing. In the first embodiment, a low-pressure labyrinth seal is operatively disposed between the housing and the tubular shaft to inhibit fluid introduced at the fluid inlet port of the housing from reaching the shaft bearings. Important to that embodiment is the provision of a high-pressure, non-contacting bushing seal assembly that is operatively disposed between the housing and the tubular shaft to inhibit fluid introduced at the fluid inlet port from reaching the low-pressure labyrinth seal. The high-pressure bushing seal comprises a plurality of silicon carbide rings that surround the tubular shaft with a low clearance fit and which are contained within a seal housing that allows minute radial displacement of the rings relative to the shaft. A weep bore is formed through the wall of the housing to expose a zone between the high-pressure bushing seal and the low-pressure labyrinth seal at ambient pressure and to allow recirculation of any cooling fluid that might seep through the low clearance gap between the high-pressure bushing seal rings and the tubular shaft.

In accordance with an alternative embodiment, the labyrinth seal is replaced by a second non-contact bushing seal having a controlled leakage to provide self-lubrication between the internal diameter of the silicon carbide rings and the shaft. In addition, a flinger is mounted on the shaft to throw any liquid seeping through the high-pressure bushing seal out through a weep hole so as to prevent it from reaching the shaft bearings.

DESCRIPTION OF THE DRAWINGS

The foregoing features, objects and advantages of the invention will become apparent to those skilled in the art from the following detailed description of a preferred embodiment especially when considered in conjunction with the accompanying drawings in which.

DESCRIPTION OF THE PREFERRED EMBODIMENT

Figure 1:
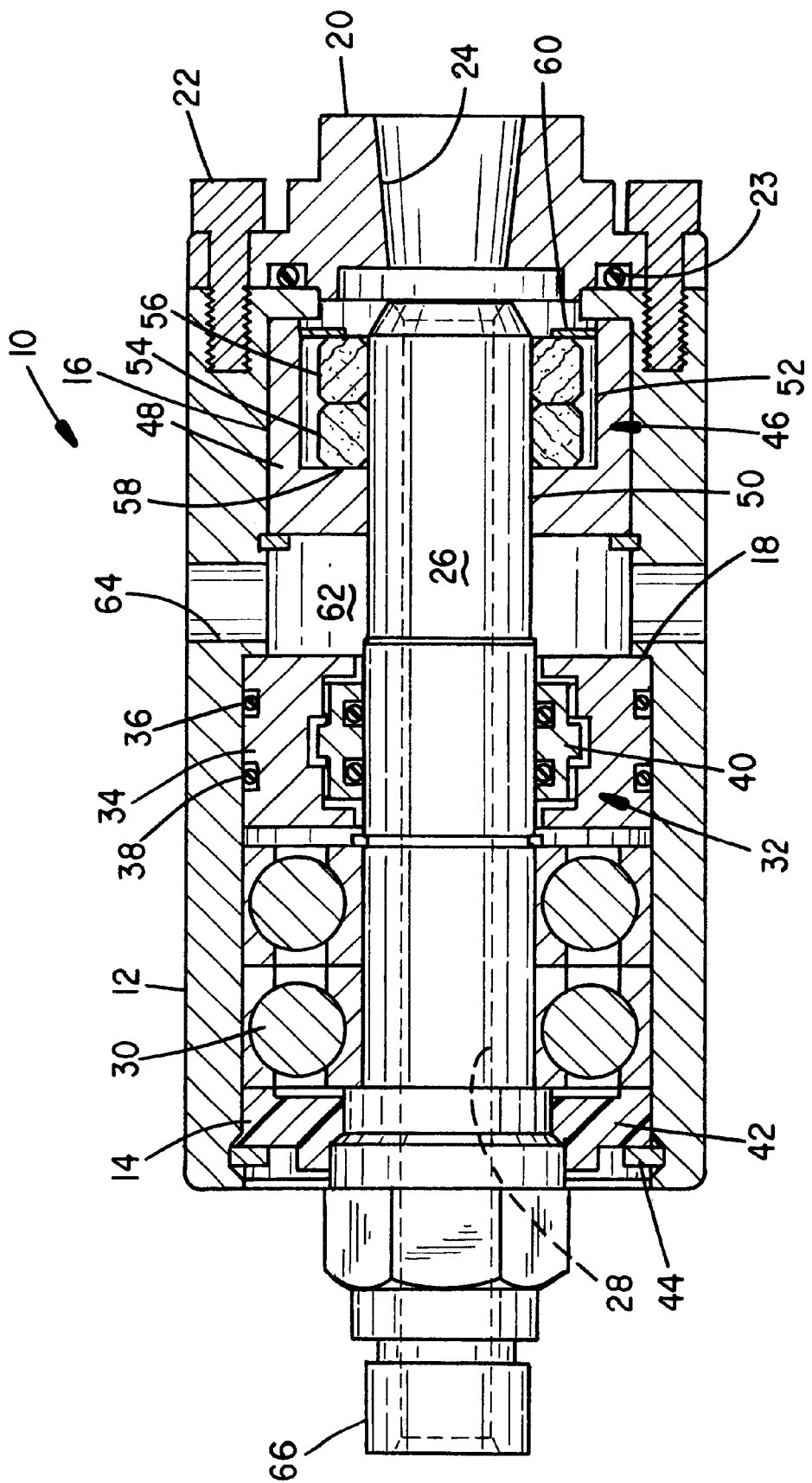
FIG. 1 is a longitudinal cross-sectional view of a preferred construction of the rotary union constructed in accordance with a first embodiment of the present invention.

Certain terminology will be used in the following description for convenience in reference only and will not be limiting. The words "upwardly", "downwardly", "rightwardly" and "leftwardly" will refer to directions in the drawings to which reference is made. The words "inwardly" and "outwardly" will refer to directions toward and away from, respectively, the geometric center of the device and associated parts thereof. Said terminology will include the words above specifically mentioned, derivatives thereof and words of similar import.

Referring then to FIG. 1, there is indicated generally by numeral 10 a dry running coolant union configured in accordance with a first embodiment of the present invention. It comprises an outer, generally cylindrical housing 12 having an internal cylindrical bore 14 and a counterbore 16 defining a shoulder 18 therebetween. Affixed to the right end of the cylindrical housing 12 is an end cap member 20 which is held in place by cap screws 22. An O-ring 23 is disposed between the housing 12 and the end cap 20. The end cap 20 includes a threaded bore 24 for receiving a hose fitting therein. Thus, fluid, under pressure, can be delivered through the hose through the inlet port 24 of the end cap.

Journaled for rotation within the cylindrical housing 12 is a tubular shaft 26 having a longitudinally extending, concentric lumen 28 through which a fluid introduced through the inlet port 24 may flow. The shaft 26 is supported by ball bearings 30, which preferably comprise silicon nitride hybrid ABEC class 9, angular-contact ball bearings which are commercially available from the New Hampshire Ball Bearing Company. These ball bearings are lubricated with an appropriate grease at the time of manufacture and a bearing protecting labyrinth seal assembly 32 is provided to prevent any coolant fluid from reaching the ball bearings 30 and washing away the grease.

The labyrinth seal assembly comprises a seal housing 34 of an annular configuration which is held in place by the shoulder 18 of the housing and which includes annular grooves as at 36 in the periphery thereof for containing a pair of O-rings as at 38. The O-rings provide a fluid tight seal between the seal housing 34 and the inner wall of the housing defining the bore 14. The bearing protecting seal assembly 32 further includes a labyrinth seal member 40 which comprises a plurality of longitudinally spaced annular projections closely cooperating with the periphery of the shaft 26. The annular strips of material that extend toward the shaft form orifices that throttle the flow and create high fluid velocities at the constriction. Fluid then expands into the annular grooves or recesses defined by the projecting rings resulting in turbulence and an associated pressure drop. Labyrinth seals suitable for use in the present invention are available commercially from the Garlock Corporation of Palmyra, N.Y., but limitation thereto is not intended.

A further bearing protector seal 42 is located at the left end of the housing 12 and is held in place by a snap ring 44. The bearing 42 may comprise a suitable plastic, such as Delrin, and prevents any splash back of coolant fluid from entering the bore 14 of the housing 12.

To isolate the low-pressure seal assembly 32 from the high-pressure coolant fluid introduced through the inlet port 24, the rotary union of the present invention includes a high-pressure bushing seal assembly indicated generally by numeral 46. The assembly 46 includes a seal housing member 48, preferably formed from stainless steel and having a central opening 50 through which the shaft 26 may pass. The seal housing 48 further includes a counterbore 52 into which may be fitted a plurality of bushing seal rings 54, 56. The bushing seal rings 54 and 56 are preferably formed from silicon carbide and the central opening thereof are dimensioned so as to provide an extremely close, but non-contacting clearance fit about the inlet end portion of the shaft 26. The plurality of bushing seal rings 54, 56 are urged together and against the shoulder 58 of the seal housing 48 by means of a spring washer 60.

The bushing seals work on the principle of the throttling action provided by a long, annular gap with a relatively small clearance between the seal rings and the shaft. In that the effectiveness of a bushing seal of the type described is directly related to fluid viscosity, they are generally suitable only for sealing liquids and, in particular, in applications where some small leakage can be tolerated. By providing a low clearance fit between the seal rings 54, 56 and the shaft 26, a floating non-contact bushing seal is created allowing the sealing rings to follow radial shaft movements. By splitting the length of the bushing into several rings, each of which is capable of limited independent movement, each ring can adjust automatically to shaft motions over its own length. Also because each ring only carries a portion of the total pressure differential, it is able to move much more freely, reducing wear occasioned by intermittent random contact between the floating rings 54, 56 and the shaft 26.

With continued reference to the embodiment of FIG. 1, located between the high-pressure seal housing 48 and the low-pressure labyrinth seal housing 34 is a zone 62 that is maintained at ambient pressure by the inclusion of drain ports 64 formed through the wall of the housing 12 and communicating with the counterbore 16 of the housing. Thus, there is a minimal pressure drop across the labyrinth seal assembly 32.

By utilizing a floating-ring type bushing seal as the high-pressure seal in the rotary union 10 of FIG. 1, problems associated with prior art rotary unions are obviated, all as has been set forth in the introductory portion of the present specification.

In operation, the tubular shaft 26 has a fitting 66 that is internally threaded to cooperate with external threads on a machine tool spindle (not shown). The spindle is driven by an electric motor at relatively high speeds and carries a tool support and bit at its opposite end. A source of high-pressure liquid is coupled by a tube (not shown) to the inlet port 24 in the end cap 20. This fluid is effectively blocked by the high-pressure seal assembly 46 from flowing along the exterior of the shaft 26 and, hence, substantially the entire flow (save modest leakage) passes through the lumen 28 of the shaft and through the tubular spindle. Any leakage through the high-pressure seal 46 escapes the weep ports 64 which may be coupled by tubing back to a reservoir. The labyrinth seal assembly 32 blocks any of the liquid seeping past the high-pressure seal from entering the bearings 30 and compromising the lubricant used on these bearings.

Without limitation, the liquid introduced through the union of the present invention may be at about 2000 psi and the shaft 26 may be driven at a substantially higher rotational velocity than can be allowed with the Deublin union described hereinabove. The delivery of high-pressure fluid through the union, the spindle to which it is attached and through the tool bit serves not only to maintain the tool bit at a relatively low temperature, even at high operating speeds, while also serving to flush and blast metal particles from the workpiece.

Figure 2:
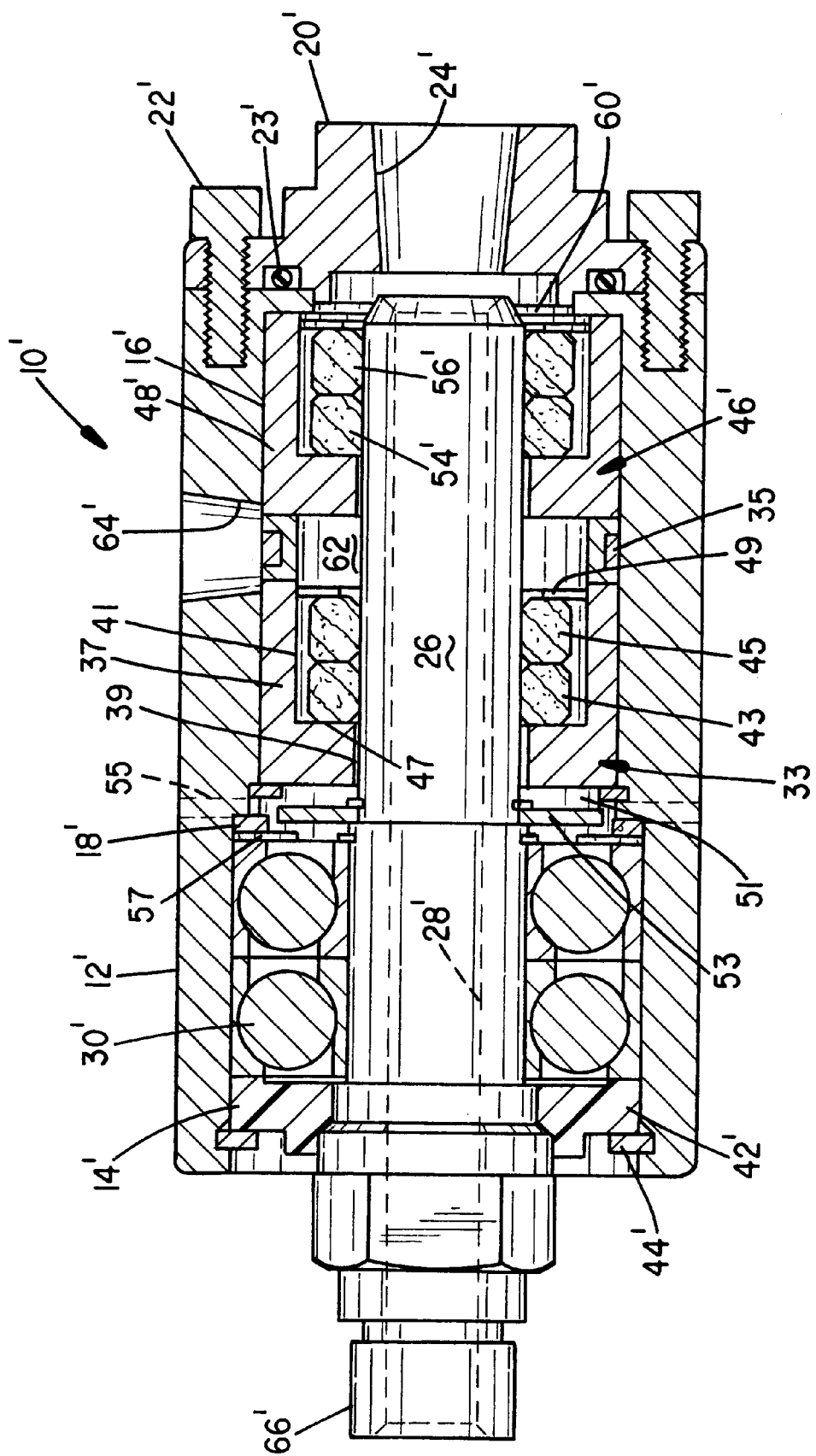
FIG. 2 is a longitudinal cross-sectional view of a preferred construction of the rotary union constructed in accordance with a second embodiment of the present invention.

Referring next to FIG. 2, there is shown an alternative embodiment of the invention. In that there is a relatively high degree of similarity between the embodiment of FIG. 1 and that of FIG. 2, parts in FIG. 2 common to those in FIG. 1 include the same reference numeral, except in FIG. 2, the reference numeral is primed.

The dry running coolant union of FIG. 2 is indicated generally by numeral 10' and is seen to comprise an outer, generally cylindrical housing 12' having an internal cylindrical bore 14' along with a counterbore 16' defining a shoulder 18' therebetween. Affixed to the right end of the cylindrical housing 12' is an end cap member 20'. The end cap 20' includes a threaded bore 24' for receiving a threaded male hose fitting therein. Thus, fluid, under pressure, can be delivered through the hose (not shown) and through the inlet port 24' of the end cap 20'. A tubular shaft 26' is journaled for rotation within the cylindrical housing 12'. The tubular shaft 26' has a longitudinally extending central lumen 28' through which a fluid introduced through the inlet port 24' may flow. The shaft 26' is supported by ball bearings 30' which, as in the embodiment of FIG. 1, may preferably be silicone nitride hybrid ABEC Class 9 angular contact ball bearings.

The ball bearings 30' are lubricated with an appropriate grease at the time of their manufacture and for long life, it is imperative that the liquid coolant pump through the coolant union not reach the bearings 30' so as to compromise the grease lubrication. To this end, the dry running coolant union 10' of the embodiment of FIG. 2 incorporates first and second bushing seals 33 and 46', respectively. The bushing seals are contained within the counterbore 16' of the housing 12' and are maintained in a spaced relationship by an apertured and externally grooved lantern ring 35. The bushing seal assembly 33 includes a seal housing member 37, preferably formed from stainless steel and having a central opening 39 through which the shaft 26' may pass. The seal housing 37 further includes a counterbore 41 into which is fitted a plurality of bushing seal rings 43 and 45. These seal rings are preferably formed from silicon carbide and the central openings thereof are dimensioned so as to provide an extremely close clearance fit about the mid-portion of the shaft 26'. The bushing seal rings 43 and 45 are urged together and against a shoulder 47 of the seal ring housing 37 by means of a spring washer 49.

The lantern ring 35 defines a zone 62' that is maintained at ambient pressure by the inclusion of drain ports 64' formed through the wall of the housing 12 and communicating with the counterbore 16' of the housing through the radial openings (not shown) formed through the lantern ring 35. Thus, there is a minimum pressure drop across the bushing seal assembly 43.

The high-pressure bearing seal 46' is substantially the same in its construction to the bushing seal assembly 46 of the embodiment of FIG. 1 so that details of its construction need not be repeated here.

The use of floating-ring type bushing seals for both the high-pressure seal 46' and the low-pressure seal 33 also obviates problems associated with prior art rotary unions. In that the rings 43, 45 and 54', 56' have a minute clearance space between their internal diameters and the outside diameter of the shaft 26', there is a controlled leakage of the coolant fluid in the interface therebetween to maintain a film of lubrication to minimize wear and to prolong the mean time-to-repair of the coolant union.

Any coolant fluid seeping along the surface of the shaft 26' through the high-pressure seal assembly 96' is permitted to drain back out through the port 64' thereby minimizing the amount of coolant fluid that needs to be blocked by the low-pressure bushing seal 33. Again, any fluid seeping between the I.D. of the sealing rings 43 and 45 and the O.D. of the shaft 26' will flow into a zone 51 between the leftmost end of the bushing housing 37 and the shaft bearing assembly 30'. Disposed within this zone and secured to the shaft 26' is a "flinger" 53 which rotates with the shaft 26' at a relatively high speed. Any moisture particles reaching the zone 51 are struck by the flinger 53, throwing that moisture out through ports 55 formed through the wall of the coolant union housing 12'.

In FIG. 2, numeral 57 refers to a bearing shield which is operatively disposed between the periphery of the flinger 53 and the ball bearing assembly 30'. It helps direct moisture struck from the flinger by reaching the shaft bearings.

As in the embodiment of FIG. 1, the dry running coolant union illustrated in FIG. 2 includes a bearing protector seal 42' at its leftmost end, that seal being held in place by a retaining ring 44'.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A rotary fluid coupling, comprising:
   (a) a housing having a wall defining a cylindrical bore;
   (b) a tubular shaft having a fluid inlet port and a fluid outlet port;
   (c) bearing means disposed in the cylindrical bore for journaling the tubular shaft for rotation therein;
   (d) a low-pressure, non-contacting fixed-clearance bushing seal assembly operatively disposed between the housing and the tubular shaft to inhibit fluid introduced at the fluid inlet port from reaching the bearing means; and
   (e) a high-pressure, non-contacting, fixed-clearance bushing seal assembly operatively disposed between the housing and the tubular shaft to inhibit fluid introduced at the fluid inlet port from reaching the low-pressure bushing seal assembly.

2. The rotary fluid coupling of claim 1 and further including a drain port formed through the wall of the housing and in fluid communication with the cylindrical bore in a zone between the low-pressure bushing seal assembly and the high-pressure bushing seal assembly to expose the zone to ambient pressure.

3. The rotary fluid coupling of claim 2 wherein the low-pressure and high-pressure bushing seal assemblies each comprise a floating bushing seal assembly.

4. The rotary fluid coupling of claim 3 wherein the low-pressure and high-pressure floating bushing seal assemblies each comprise a plurality of rings having a clearance fit relative to a portion of the tubular shaft, the plurality of rings having limited radial movement relative to the tubular shaft.

5. The rotary fluid coupling of claim 4 and further including biasing means for inhibiting longitudinal displacement of the plurality of rings along said tubular shaft.

6. The rotary fluid coupling of claim 4 wherein the plurality of rings comprises silicon carbide rings.

7. The rotary fluid coupling of claim 4 wherein each of the low-pressure and high-pressure bushing seal assemblies further includes an annular seal housing disposed between the cylindrical bore of the housing and the tubular shaft, said seal housing including a counterbore containing the plurality of rings.

8. The rotary fluid coupling of claim 1 and further including a first end cap affixed to one end of the housing and including a central bore in fluid communication with the cylindrical bore in the housing upstream of the fluid inlet port.

9. The rotary fluid coupling of claim 1 and further including a flinger affixed to the tubular shaft at a location between the bearing means and the low pressure seal for imparting radially directed forces on liquid droplets that may find their way through the low-pressure seal.

10. The rotary fluid coupling of claim 1 and further including means on said tubular shaft adapted to affix the tubular shaft to a rotary spindle of a machine tool.

* * * * *